June 4, 1968  J. S. KILBY  3,386,187
TEACHING MACHINE
Filed Feb. 28, 1966  5 Sheets-Sheet 1
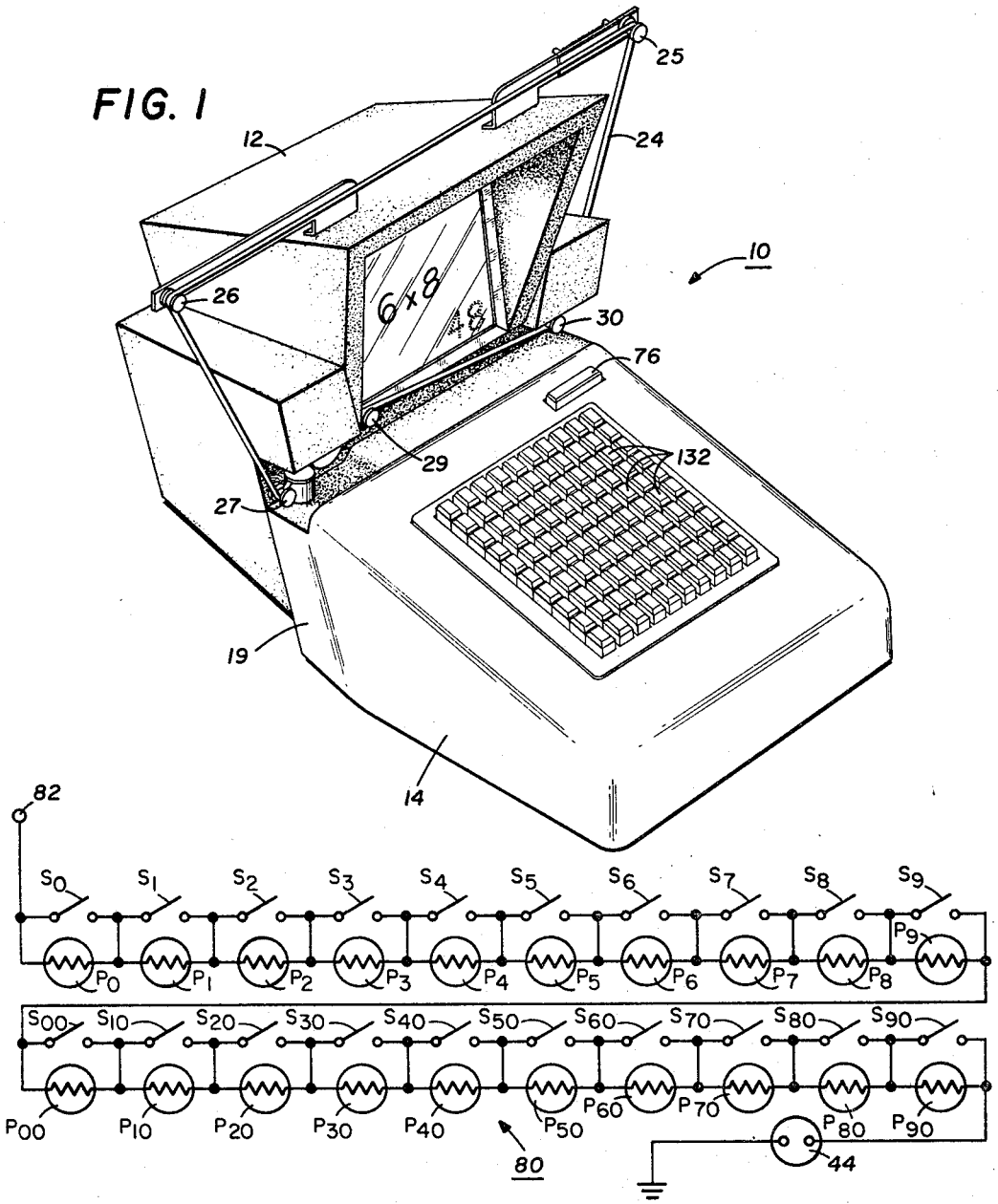
INVENTOR
JACK S. KILBY
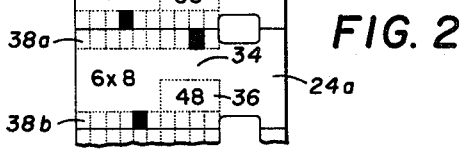
ATTORNEY INVENTOR
JACK S. KILBY
E. Mickey Hubbard
ATTORNEY

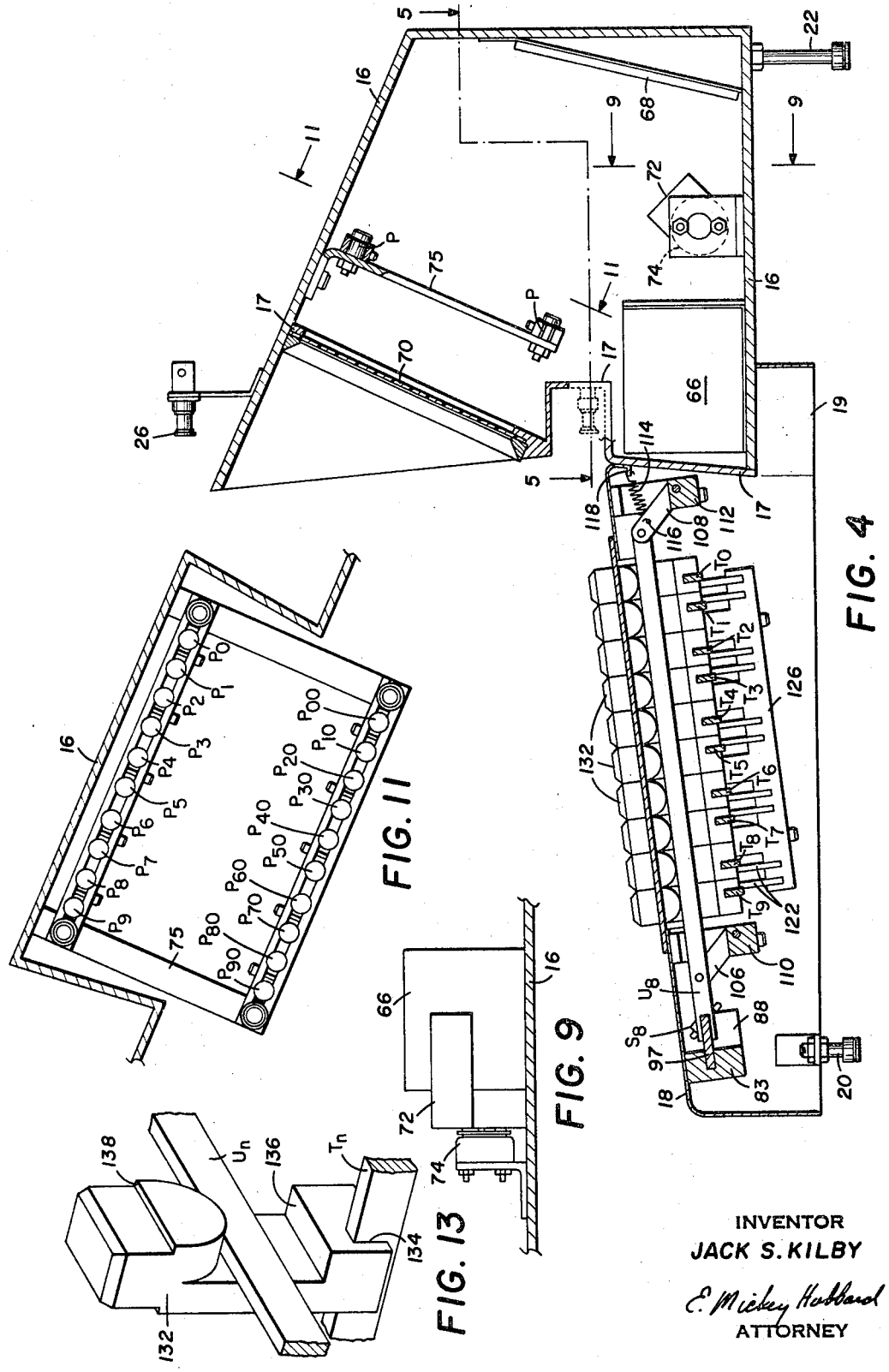

June 4, 1968          J. S. KILBY          3,386,187
TEACHING MACHINE
Filed Feb. 28, 1966          5 Sheets-Sheet 4
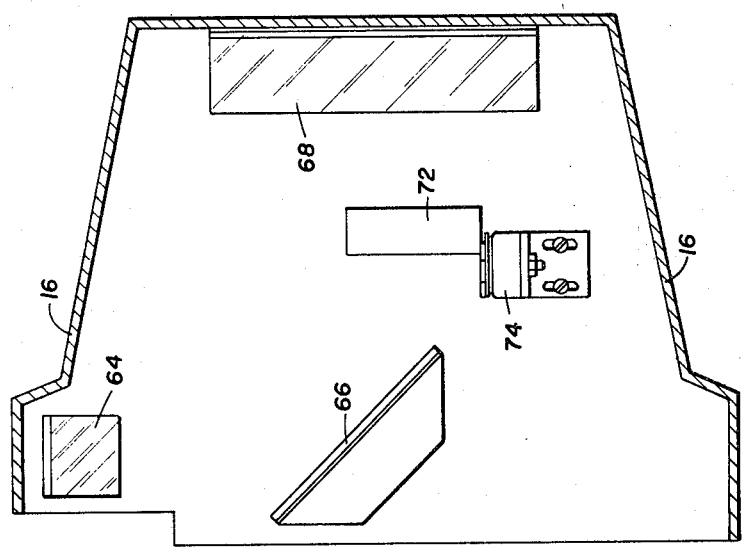
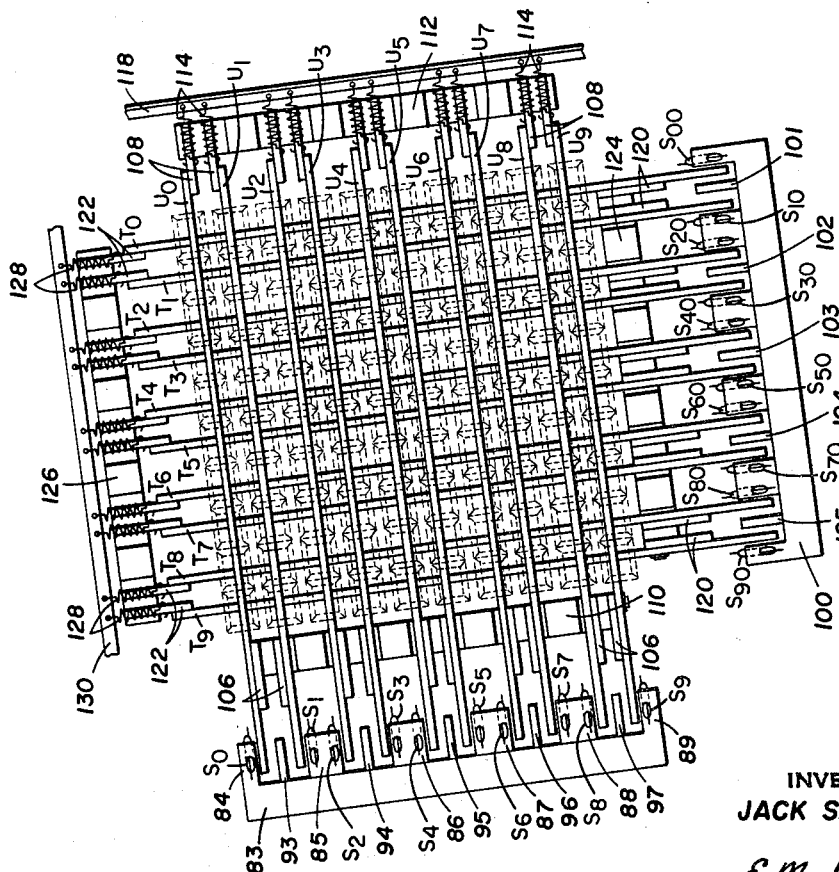
INVENTOR
JACK S. KILBY
ATTORNEY June 4, 1968   J. S. KILBY   3,386,187
TEACHING MACHINE
Filed Feb. 28, 1966   5 Sheets-Sheet 5
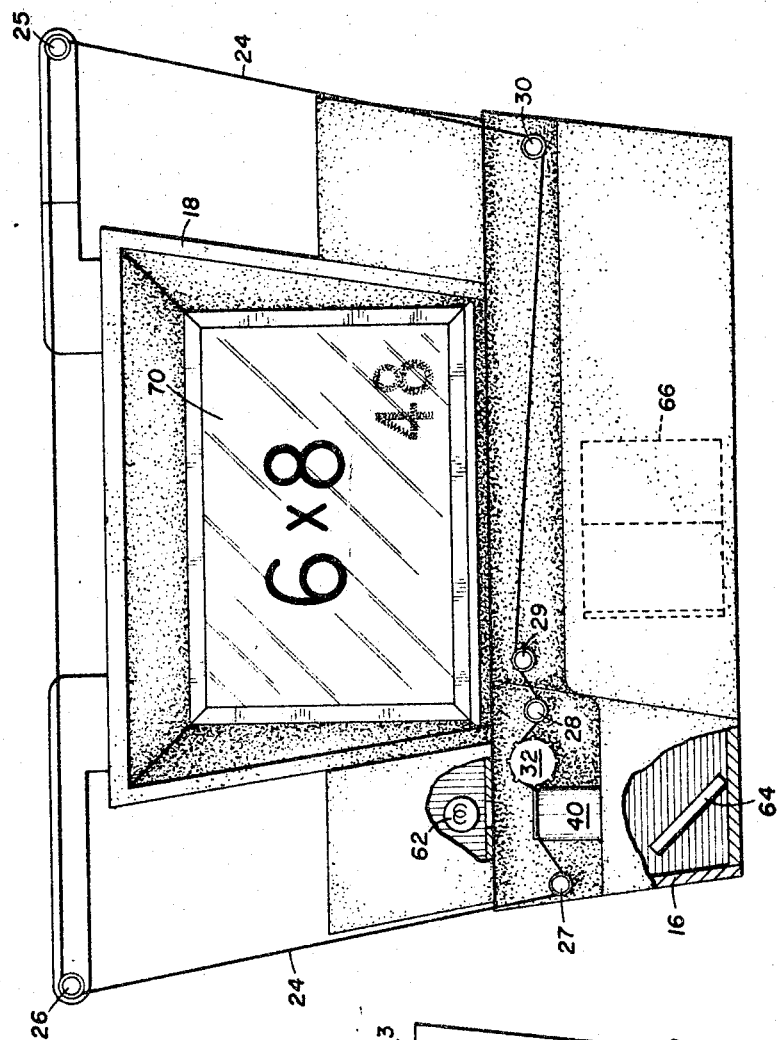
FIG. 6
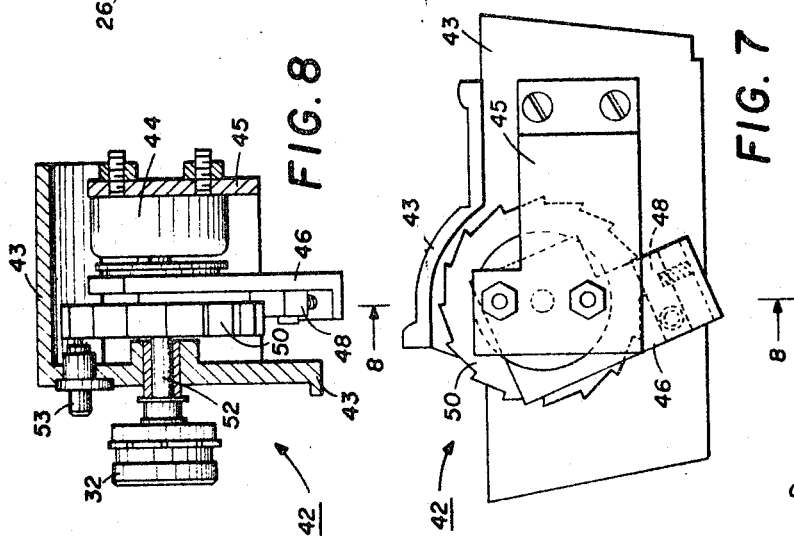
FIG. 7
FIG. 8
INVENTOR
JACK S. KILBY
C. Mickey Hubbard
ATTORNEY

United States Patent Office 3,386,187
Patented June 4, 1968

3,386,187
TEACHING MACHINE
Jack S. Kilby, Dallas, Tex., assignor to Texas Instruments Incorporated, Dallas, Tex., a corporation of Delaware
Filed Feb. 28, 1966, Ser. No. 530,481
8 Claims. (Cl. 35—9)

This invention relates generally to education, and more particularly, but not by way of limitation, relates to a machine for teaching arithmetic or other subjects which can be taught by repetitive drill.

Some subjects, such as addition, subtraction, multiplication, division, and simple algebra, can best be taught by drill or repetitive testing. Simpler problems which should be answered on sight, such as the multiplication tables, are often taught by flash cards. This technique has the advantage of immediately providing the correct answer after each problem, but this process is not very rapid and each individual in a class may be tested only a few times, at best, during any one session. A written test consisting of a large number of problems not only tends to be laborious, but it is often days before the corrected answers are returned to the students. A large number of different types of teaching machines have been proposed, ranging from very simple devices for moving a scroll of paper to very large computers. None of these devices have achieved widespread use. Those that perform their intended function satisfactorily are generally relatively expensive when compared to the function accomplished, and preparation of the material to be taught is a major item in the cost of using these machines.

An important object of this invention is to provide a device for teaching mathematics and the like that is relatively inexpensive to manufacture and use.

Another object is to provide a teaching machine which permits the student to proceed at his own selected pace.

Still another object is to provide a teaching machine wherein the correct answer is selected merely by selecting and pressing a single key.

Yet another object is to provide a teaching machine which utilizes subject material in a form which can be easily and economically prepared.

A further object is to provide a teaching machine which utilizes a single film strip for presenting the problems and programming the correct answer into the machine for comparison with the answer selected by the student.

Another object is to provide a simple and economical means for comparing the answer selected by the student with the correct answer.

A further object is to provide such a comparison means which may be programmed by light projected from a film.

In accordance with the present invention, the problems are prepared on a film strip and presented to the student, one at a time. The student responds by selecting one of a number of keys representative of the possible answer. If the key corresponding to the correct answer is selected, the film strip is automatically indexed to the next frame. If the incorrect answer is selected, the student may either select another key, or may depress an answer button which causes the correct answer to be revealed. Then by depressing the correct key, the film strip will index to the next problem.

More specifically, the teaching machine utilizes a film means, such as a film strip, having a plurality of frames each of which has a first image area for a written problem, a second image area for a programmed answer to the problem, and a third image area for a written answer to the problem. The three image areas of a selected frame are projected by a projection means which includes an electrically operated indexing means for selecting the next successive frame for projection when the indexing means is energized by an electrical signal. A display means is provided for displaying the question of the first image area and the answer of the third image area to the student. An electrically operated masking means is provided for preventing the student from viewing the image from the third image area until the masking means is energized. An electrically operated comparison means compares the programmed answer from the second image area to an answer selected by the student. If the selected answer is correct, the indexing means is energized to index the next successive frame into position so that the three image areas of that frame will be projected. The masking means may be manually energized to reveal the correct answer when desired by the student.

In accordance with a more specific anspect of the invention, the second image area is divided into a number of subareas each of which is representative of a numerical value. The electrically operated comparison means comprises a ladder network formed by a plurality of serially connected photosensitive switching means and a manually actuated switch means is connected in shunt around each photosensitive switching means. Each of the photosensitive switching means is positioned to be illuminated by light projected through one subarea of the second image area. The correct answer is encoded in the third area of the film frame by opaquing out selected subareas so that all but the photosensitive switching means representative of the correct answer will be closed. Then when the student selects the correct answer by closing the manually actuated switch means connected in shunt around the open photosensitive switching means, a circuit will be completed through the ladder network to energize the indexing means and thereby index the next frame into position.

In accordance with a more specific aspect of the invention, there are two decades of subareas on each frame of the film and two decades of photosensitive switching means and manually actuated switching means. Each of the manually actuated switching means in the units decade is closed by depressing one of ten parallel units decade bars, and each of the manually actuated switching means in the tens decade is closed by depressing one of ten parallel tens decade bars. The units and tens decade bars are disposed at angles so as to form an intersection between each units decade bar and each tens decade bar, thus providing one hundred intersections corresponding to the numbers in two decades. A key means is positioned at each intersection and when depressed, simultaneously depresses both the units and tens decade bars forming the intersection to simultaneously close both the corresponding units and tens manually actuating switching means.

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

FIGURE 1 is a perspective view of a machine constructed in accordance with the present invention;

FIGURE 2 is a schematic representation of the film strip used in the machine of FIGURE 1;

FIGURE 4 is a longitudinal sectional view taken substantially on lines 4—4 of FIGURE 3;

FIGURE 5 is a sectional view taken substantially on lines 5—5 of FIGURE 4;

FIGURE 6 is a front elevation of the optical section of the machine of FIGURE 1;

FIGURE 7 is a side view of the indexing mechanism of the machine of FIGURE 1;

FIGURE 8 is a sectional view taken substantially on lines 8—8 of FIGURE 7;

FIGURE 9 is a sectional view taken on lines 9—9 of FIGURE 4;

FIGURE 10 is a schematic circuit diagram of the comparison means of the machine of FIGURE 1;

FIGURE 11 is a sectional view taken substantially on lines 11—11 of FIGURE 4;

FIGURE 12 is a plan projection from FIGURE 4 of the keyboard actuating mechanism of the machine of FIGURE 1 with the keys indicated in dotted outline; and FIGURE 13 is an isometric view of a key of the machine of FIGURE 1.

Figure 3:
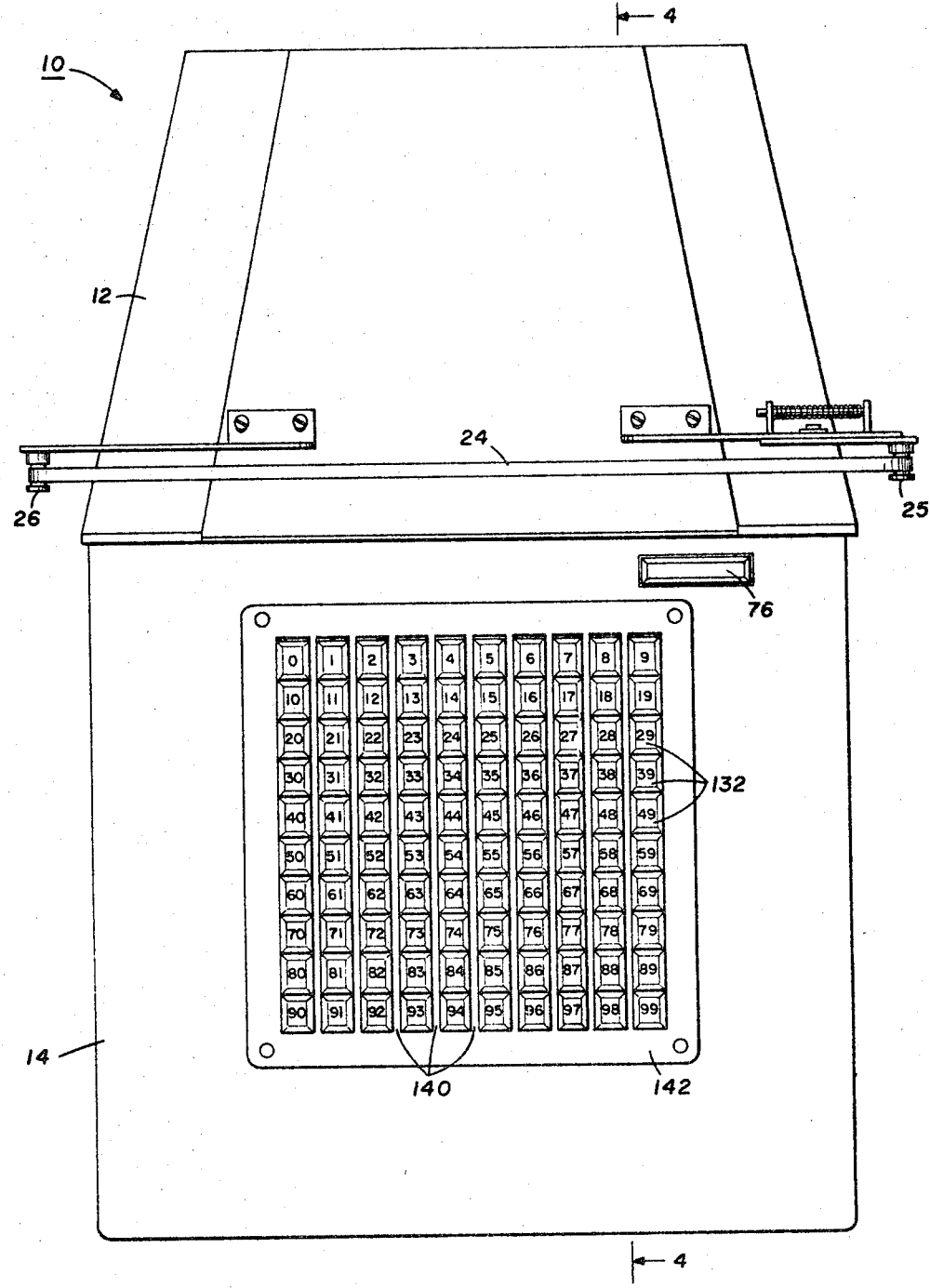
FIGURE 3 is a plan view of the machine of FIGURE 1.

Referring now to the drawings, a machine constructed in accordance with the present invention is indicated generally by the reference numeral 10. The machine 10 has an optical section indicated generally by the reference numeral 12 and a keyboard section indicated generally by the reference numeral 14. The optical section 12 has a thin shelled housing comprised of a rear portion 16, which forms the top, bottom, side and rear walls, and a front portion 17. The keyboard section has a thin walled housing 18 which forms the top, front and side walls of the section. The section does not have a bottom wall or a rear wall, and the side walls have tab portions 19 which extend along either side of the housing 16 and are connected thereto to rigidly interconnect the two sections. The interconnected housings 16 and 18 have sufficient strength to support the operative parts which will presently be described and are supported by front and rear legs 20 and 22 so that the machine may be placed on the student's desk during use.

The machine 10 uses an endless film strip 24 which passes around a spring biased idler roller 25 and idler rollers 26–30. The film strip 24 may be standard 8 mm. or 16 mm. film. Each frame of the film 24, frame 24a for example, is divided into a first image area 34 wherein the problem is presented in writing, a second image area comprised of strips 38a and 38b at the top and bottom of the frame for the answer in binary coded form to program the machine, and a third image area 36 wherein the answer to the problem is written. For purposes which will hereafter be described in detail, the strip area 38a is divided into ten subareas representing the numbers zero through nine in a units decade, and the strip area 38b is divided into ten subareas representing the numbers zero through nine in a tens decade.

The frames 24a, 24b, etc. of the film 24 are successively indexed past a lens barrel 40 by a standard film drive sprocket 32 which is rotated through a predetermined angle by the drive mechanism indicated generally by the reference numeral 42. The mechanism 42 is supported on a bracket 43 which is connected to the housing 16. The shaft of a rotary solenoid 44, which is supported by bracket 45 and connected to bracket 43, drives an arm 46 carrying spring biased pawl 48. The pawl 48 engages a ratchet wheel 50 which is connected to the shaft 52 which is journaled in the bracket 43 and carries the film drive sprocket 32. Each time that the rotary solenoid 44 is energized, the arm 46 is rotated and the pawl 48 engages the ratchet wheel 50 so as to rotate the sprocket 32 through an angle sufficient to advance the film one frame. A suitable drag brake 53 continually engages the ratchet wheel 50 to hold the sprocket 32 in any set position. When the solenoid 44 is de-energized, it automatically returns the arm 46 to a position such that the pawl 48 will fall behind the next tooth on the ratchet wheel 50.

A suitable light source 62 is positioned above the lens barrel 40 so that the three image areas 34, 36 and 38a–38b are projected downwardly through the lens barrel 40 to a mirror 64, horizontally and transversely to a mirror 66, and rearwardly and slightly upwardly to a mirror 68. The image from the first image area 34 is then reflected onto a viewing screen 70 so as to continually present the problem to the student. The image from the third image area 36 is normally blocked from the viewing screen 70 by a masking plate 72. However, the masking plate 72 may be pivoted downwardly and out of the line of projection by energization of a rotary solenoid 74 so that the answer written in the image area 36 may also be projected onto the viewing screen 70. In the simpler form of the invention, the solenoid 74 is energized by depressing button 76 which closes a conventional switch (not illustrated). The switch is normally spring biased into the open position so that the solenoid 74 will be energized and the answer revealed on the viewing screen 70 only while the key 76 is depressed.

As previously mentioned, the image area 38a is divided into ten subareas representing the numbers zero through nine in the units decade, and the image area 38b is divided into ten subareas representing the numbers zero through ninety in the tens decade. The ten subareas of the image area 38a are reflected by mirrors 64, 66 and 68 onto ten photoresistors $P_0$–$P_9$, respectively, and the ten subareas of the image area 38b are similarly projected onto ten photoresistors $P_{00}$–$P_{90}$. The twenty photoresistors may be supported by a rectangular bracket 75 suspended from the housing 16.

The photoresistors $P_0$–$P_9$ and $P_{00}$–$P_{90}$ are electrically connected in series and form one rail of a comparator ladder network indicated generally by the reference numeral 80 in FIGURE 10. Manually actuated switches $S_0$–$S_9$ are connected in shunt around the photoresistors $P_0$–$P_9$, respectively, and manually actuated switches $S_{00}$–$S_{90}$ are connected in shunt across photoresistors $P_{00}$–$P_{90}$, respectively. The ladder network 80 connects the rotary solenoid 44 to a voltage source 82. When the photoresistors P are not illuminated by the light source 62, they have a high impedance and may be considered as an open photosensitive switch. When illuminated by the light source 62, the photoresistors have a very low impedance and may be considered as a closed switch.

The switches $S_n$ may be conventional glass encapsulated reed switches of the type which are used extensively in telephone switching circuitry, and which may be opened and closed magnetically. The units decades of switches $S_0$–$S_9$ are connected to a support 83 which may depend from the top of the housing 18. The switch $S_0$ is supported on an arm 84, switches $S_1$ and $S_2$ on an arm 85, switches $S_3$ and $S_4$ on an arm 86, switches $S_5$ and $S_6$ on an arm 87, switches $S_7$ and $S_8$ on an arm 88 and switch $S_9$ on an arm 89. Permanent magnets 93–97 extend from the support 83 between adjacent pairs of the switches $S_n$. The tens decade of switches $S_{00}$–$S_{90}$ are mounted on a similar support 100 and permanent magnets 101–105 are disposed between adjacent pairs of the switches. Each of the units decade switches $S_0$–$S_9$ is normally shielded from the magnetic field of the adjacent permanent magnets 93–97 by the end of one of the bars $U_0$–$U_9$ so that each of the switches is normally open. The tens decade switches $S_{00}$–$S_{90}$ are similarly shielded from the adjacent magnets 101–105 by bars $T_0$–$T_9$, respectively. Each of the bars $U_0$–$U_9$ is pivotally supported at opposite ends by lever arms 106 and 108, which in turn are pivotally connected to brackets 110 and 112, respectively, which in turn may be attached to the housing 18. Each of the bars $U_0$–$U_9$ is individually spring biased into the raised position by a spring 114 which is connected to the respective arm 108 at the point 116 and to a bracket 118 formed by an inturned edge of the housing 18. The tens decade bars $T_0$–$T_9$ are similarly pivotally supported by pivot arms 120 and 122 which are pivotally connected to supports 124 and 126, respectively, which may also be connected for support to the housing 18. A spring 128 interconnects each of the arms 120 and a bracket 130 affixed to the underside of the housing 18 for biasing each of the bars $T_0$–$T_9$ into the raised position. When any one of the bars $U_0$–$U_9$ or $T_0$–$T_9$ is pivoted downwardly, the corrresponding switch $S_0$–$S_9$ or $S_{00}$–$S_{90}$ is subjected to the magnetic field of the adjacent magnet and is closed.

One hundred keys indicated by the reference numeral 132 are provided for actuation by the student in selecting his answer. Each of the keys 132 is positioned at the intersection of one bar from the units set bars $U_0$–$U_9$ and one bar from the tens decade set bars $T_0$–$T_9$, and the key is provided with a number corresponding to the number represented by the two bars. Thus the key numbered "nine" is positioned at the intersection of bar $U_9$ and bar $T_0$, the key numbered "eighty-eight" is positioned at the intersection of bars $U_8$ and $T_8$, etc. Each of the keys 132 is formed substantially as illustrated in FIGURE 13 and has a slot 134 formed in the bottom end thereof which slidably fits over the corresponding bar $T_n$ and a slot 136 at a midpoint thereof for slidably receiving the corresponding bar $U_n$. The upper end of the key may be narrower than the remainder of the key so as to form shoulders 138 which will engage retainer strips 140 of a retaining plate 142 and hold the keys in place between the plate 142 and the spring biased bars $U_n$ and $T_n$. Thus when any one of the keys 132 is depressed by the student, one of the bars $U_n$ and one of the bars $T_n$ will be pivotally moved downwardly so that the corresponding switches $S_n$ and $S_{nn}$ will no longer be shielded from the adjacent magnets and will be closed.

In the operation of the teaching machine 10, the film strip 24 is threaded into the projection means so that the problem recorded in the first image area 34 of the frame disposed over the lens barrel 40 is continually projected onto the viewing screen 70. The written answer in the area 36 is blocked by the masking plate 72 because the solenoid 74 is de-energized. The light projected through the areas 38a and 38b which are not opaqued illuminates and closes the respective photosensitive switches $P_0$–$P_7$, $P_9$, $P_{00}$–$P_{30}$ and $P_{50}$–$P_{90}$. However, since the subareas which are projected onto the photosensitive resistors $P_8$ and $P_{40}$ are opaqued, these resistors remain resistive, i.e., the photosensitive switches remain open, and the solenoid 44 of the film indexing mechanism remains de-energized. The only way that the solenoid 44 can be energized is to simultaneously close the switches $S_8$ and $S_{40}$ so as to complete a shunt circuit around the open photoresistor switches $P_8$ and $P_{40}$. This can be accomplished only by depressing the button numbered forty-eight so as to depress bar $U_8$ and bar $T_4$. If the student depresses any other button, which would be an incorrect answer, nothing happens. After an incorrect answer, the student may either reconsider and try another answer, or may press the answer button 76 which energizes the solenoid 74 and rotates the masking plate 72 out of the line of projection of the third image area 36 thereby revealing the written answer on the screen 70. Thus, prompted, the student can depress the key corresponding to the correct answer and the solenoid 44 will be energized. This indexes the film strip 24, presents the next problem on the screen 70 and automatically programs the comparator ladder 80 with the correct answer. It is important to note that even when the correct answer is revealed to the student, the student must nevertheless affirmatively respond by selecting and depressing the correct key.

From the above detailed description of a preferred embodiment of the invention, it will be appreciated that a rather simple and inexpensive device has been disclosed. The film strip may be prepared with a minimum of effort and expense. The student may be rapidly drilled on basic addition, subtraction, multiplication and division at a level where an answer should be made on sight. The machine uses accepted principles in the learning process of presenting the problem, requiring an overt act by the student in response to the problem, and immediately providing access to the correct answer if an incorrect response is made. The machine permits each student to proceed at his own maximum rate, thus enhancing the learning process, and the endless tape permits the drill to be repeated with ease until no further errors are made by the student. The machine may also be used to advantage in teaching more difficult math which would require penciled calculations by the student, such as algebra, so long as the answer does not exceed the number of keys.

Although a preferred embodiment of the invention has been described in detail, it is to be understood that various changes, substitutions and alterations can be made therein without departing from the spirit and scope of the invention as defined by the appended claims.

What is claimed is:
1. In a teaching machine, the combination of:
film means having a series of frames, each frame having a first image area for a written question and a second image area comprised of a number of subareas for a programmed answer,
projection means for projecting the first and second image areas of a frame positioned at a projection station including electrically operated indexing means for moving the next frame to the projection station when energized,
display means for displaying the image projected from the first image area, and
multiple choice comparison means comprising a number of photosensitive switching means corresponding to the number of subareas electrically connected in a series circuit for energizing the indexing means, each photosentitive switching means being positioned to be illuminated by light projected through the corresponding subareas, the photosensitive switching means being essentially nonconductive when in a first state of illumination and conductive when in a second state of illumination, and a manually operable switch means connected in shunt around each photosensitive switching means,
said multiple choice comparison means is programmed by opaquing out one or more of the subareas so as to render the photosensitive switching means corresponding to the correct answer nonconductive, closure of the manually operable switch means connected in shunt around the nonconductive photosensitive switching means causing the indexing means to index the next frame into position thereby indicating a correct answer by the student.

2. The combination defined in claim 1 wherein:
there is a first set of subareas, a first set of photosensitive switch means, a first set of manually operable switch means, a second set of subareas, a second set of photosensitive switch means, a second set of manually operable switch means, and further characterized by
a first set of bars each adapted to close one of the manually operable switch means of the first set of manually operable switch means when depressed, a second set of bars each adapted to close one of the manually operable switch means of the second set of manually operable switch means when depressed, the second set of bars extending transversely of the first set of bars, each bar of the second set forming an intersection with each bar of the first set, and key means positioned at each intersection for simultaneously depressing the bar of the first set and the bar of the second set at the intersection to simultaneously close the corresponding manually operable switch means.

3. The combination defined in claim 2 wherein:

there are ten subareas in each of the first and second sets of subareas, ten photosensitive switching means in each of the first and second sets of photosensitive switching means, ten manually operable switch means in each of the first and second sets of manually operable switch means, and ten bars in each of the first and second sets of bars to provide one hundred intersections, and a key means positioned at each intersection to provide one hundred keys whereby any two digit number can be selected by depressing a single key.

4. In a teaching machine, the combination of:

film means having a series of frames, each frame having a first image aera for a written answer and a second image area comprised of two sets of subareas for a programmed answer, projection means for projecting the first and second image areas of a frame positioned at a projection station including electrically operated indexing means for moving the next frame to the projection station when energized, display means for displaying the image projected from the first image area, and multiple choice comparison means programmed by the image projected from the second image area for comparing a multiple choice answer selected by a student with a correct answer programmed in the second image area, the comparison means being connected to energize the indexing means when the selected answer corresponds to the programmed answer to index the film means to the next frame, the multiple choice comparison means including first and second sets of manually operable switches, a first set of generally parallel bars each adapted to operate one of the manually operable switches of the first set of manually operable switches and a second set of generally parallel bars each adapted to operate one of the manually operable switches of the second set of manually operable switches, the second set of bars being disposed at an angle to the first set of bars to form an intersection between each bar of the first set and each bar of the second set, and key means positioned at each intersection for simultaneously depressing the bar of the first set and the bar of the second set at the intersection to simultaneously close the corresponding manually operable switches.

5. In a teaching machine for use with a film means having a series of frames, each frame having a first image area for a written answer and a second image area comprised of a number of subareas for a programmed answer, the combination of:

projection means for projecting the first and second image areas of a frame positioned at a projection station including electrically operated indexing means for moving the next frame to the projection station when energized, display means for displaying the image projected from the first image area, and multiple choice comparison means comprising a number of photosensitive switching means corresponding to the number of subareas electrically connected in a series circuit for energizing the indexing means, each photosensitive switching means being positioned to be illuminated by light projected through the corresponding subareas, the photosensitive switching means being essentially non-conductive when in a first state of illumination and conductive when in a second state of illumination, and a manually operable switch means connected in shunt around each photosensitive switching means.

said multiple choice comparison means is programmed by opaquing out one or more of the subareas so as to render the photosensitive switching means corresponding to the correct answer nonconductive, closure of the manually operable switch means connected in shunt around the nonconductive photosensitive switching means causing the indexing means to index the next frame into position thereby indicating a correct answer by the student.

6. In a teaching machine for use with a film means having a series of frames, each frame having a first image area for a written question and a second image area for a programmed answer comprised of a first set of subareas and a second set of subareas, the combination defined in claim 5 further characterized by:

a first set of photosensitive switching means corresponding in number to the number of subareas of the first set of subareas and a second set of photosensitive switching means corresponding in number to the number of subareas of the second set of subareas, a first set of bars each adapted to close one of the manually operable switch means of the first set of manually operable switch means when depressed, a second set of bars each adapted to close one of the manually operable switch means of the second set of manually operable switch means when depressed, the second set of bars extending transversely of the first set of bars, each bar of the second set forming an intersection with each bar of the first set, and key means positioned at each intersection for simultaneously depressing the bar of the first set and the bar of the second set at the intersection to simultaneously close the corresponding manually operable switch means.

7. The combination defined in claim 6 wherein:

there are ten subareas in each of the first and second sets of subareas, ten photosensitive switching means in each of the first and second sets of photosensitive switching means, ten manually operable switch means in each of the first and second sets of manually operable switch means, and ten bars in each of the first and second sets of bars to provide one hunderd intersections, and a key means positioned at each intersection to provide one hundred keys whereby any two digit number can be selected by depressing a single key.

8. In a teaching machine for use with a film means having a series of frames, each frame having a first image area for a written answer and a second image area comprised of two sets of subareas for a programmed answer, the combination of:

projection means for projecting the first and second image areas of a frame positioned at a projection station including electrically operated indexing means for moving the next frame to the projection station when energized.

display means for displaying the image projected from the first image area, and multiple choice comparison means programmed by the image projected from the second image area for comparing a multiple choice answer selected by a student with a correct answer programmed in the second image area, the comparison means being connected to energize the indexing means when the selected answer corresponds to the programmed answer to index the film means to the next frame, the multiple choice comparison means including first and second sets of manually operable switches, a first set of generally parallel bars each adapted to operate one of the manually operable switches of the first set of manually operable switches and a second set of generally parallel bars each adapted to operate one of the manually operable switches of the second set of manually operable switches, the second set of bars being disposed at an angle to the first set of bars to form an intersection between each bar of the first set and each bar of the second set, and key means positioned at each intersection for simultaneously depressing the bar of the first set and the bar of the second set at the intersection to simultaneously close the corresponding manually operable switches.

References Cited

UNITED STATES PATENTS

| | | | |
|---|---|---|---|
| Re. 23,030 | 8/1948 | Holt | 35—9 |
| 2,401,434 | 6/1946 | Mills | 35—9 |
| 3,052,041 | 9/1962 | Luxton et al. | 35—9 |
| 3,095,654 | 7/1963 | Cummings | 35—9 |
| 3,137,948 | 6/1964 | Wycoff | 35—9 |
| 3,172,216 | 3/1965 | Mueller | 35—9 |

EUGENE R. CAPOZIO, *Primary Examiner.*

W. W. NIELSEN, S. M. BENDER,
*Assistant Examiners.*